United States Patent [19]

Thurner

[11] Patent Number: 4,600,070
[45] Date of Patent: Jul. 15, 1986

[54] MODULAR TILLER HITCH FOR A LAWN AND GARDEN TRACTOR

[75] Inventor: Gary H. Thurner, Port Washington, Wis.

[73] Assignee: Bolens Corporation, Port Washington, Wis.

[21] Appl. No.: 636,402

[22] Filed: Jul. 31, 1984

[51] Int. Cl.[4] .................. A01B 33/08; A01B 33/02; B60K 25/02
[52] U.S. Cl. .................. 180/53.7; 172/272; 172/60; 172/125; 180/53.1; 474/134
[58] Field of Search .............. 172/43, 248, 42, 125, 172/247, 272, 274, 60; 474/113, 115, 117, 133, 134; 292/62; 180/53.1, 53.7

[56] References Cited

U.S. PATENT DOCUMENTS

| | | | |
|---|---|---|---|
| 57,616 | 8/1866 | Allamby | 292/62 |
| 2,619,885 | 12/1952 | Beamer | 172/272 X |
| 3,028,919 | 4/1962 | Smith et al. | 172/125 |
| 3,187,821 | 6/1965 | Kamlukin | 172/125 X |
| 4,333,250 | 6/1982 | Henderson | 172/272 X |

OTHER PUBLICATIONS

26" Rotary Tiller Attachment/Owner's Guide and Parts List, Gilson Bros. Co. (#GIL-33895A), Bolens Corp. (#20326) Mar. 1982.

Primary Examiner—Richard J. Johnson
Assistant Examiner—Terrence L. B. Brown
Attorney, Agent, or Firm—Quarles & Brady

[57] ABSTRACT

A modular hitch unit is attached to a lawn and garden tractor and then to a tiller. The hitch unit includes hitching mechanisms as well as hand-operable belt adjustment mechanisms for positioning and adjusting the tension of a drive belt. A lever is operated to pivot a countersprung idler pulley to allow the belt to be placed in its operating position. A knob is then turned to adjust the pivotable position of a second idler pulley to control the tension of the belt. The idler pulleys can be switched and the belt remounted to change the direction in which a set of tiller tines are driven.

10 Claims, 8 Drawing Figures

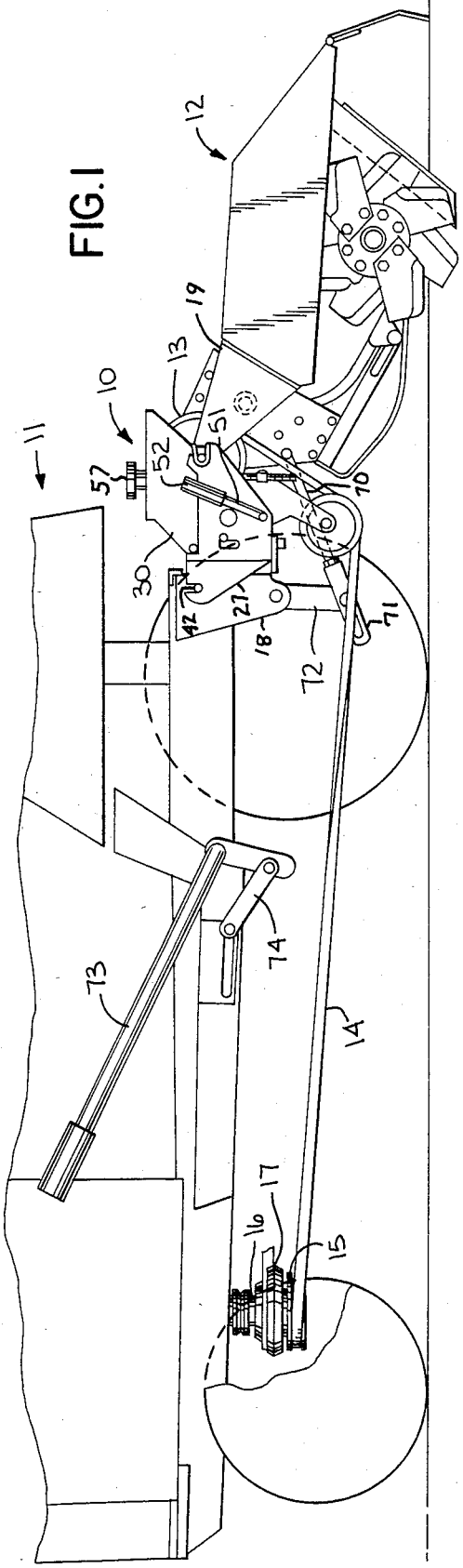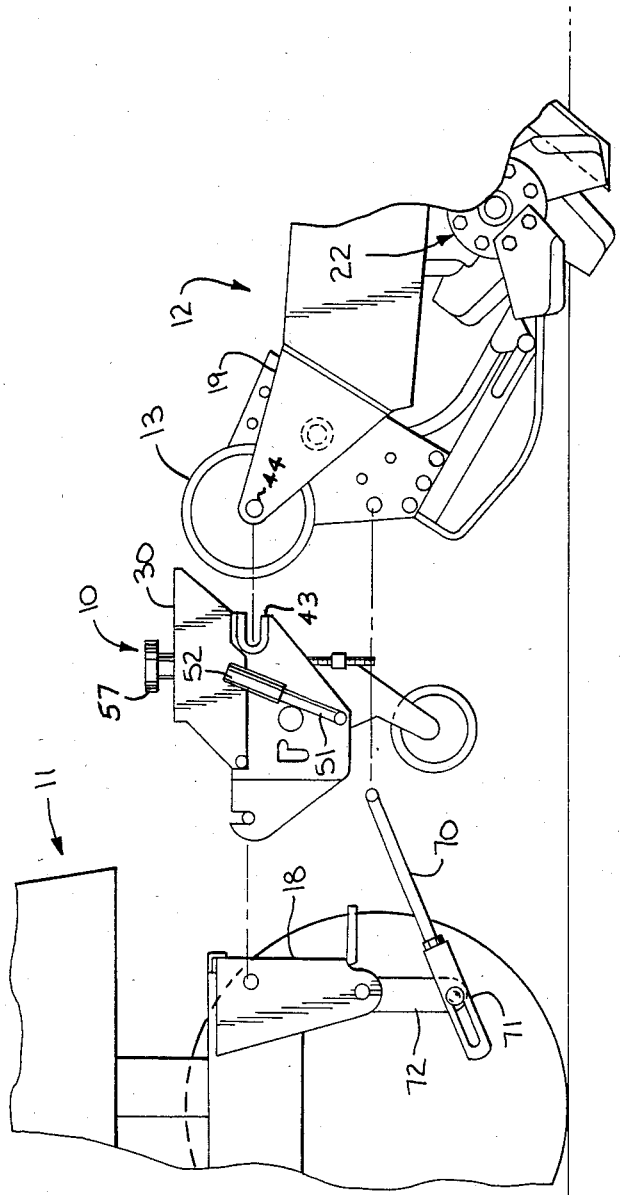

MODULAR TILLER HITCH FOR A LAWN AND GARDEN TRACTOR

BACKGROUND OF THE INVENTION

The field of the invention is lawn and garden equipment, and more particularly belt-driven attachments for such equipment.

Small scale tractors have provided residents of suburban and country areas with greater self-sufficiency, convenience and satisfaction by making it possible to maintain lawns, cultivate gardens and clear driveways of snow with a single mechanized system. Such tractors are typically offered with a variety of attachments for performing different jobs. The attachments can be bulky and are not always easy to install and change.

For example, a prior tiller attachment often required two people for positioning it behind a tractor. The attachment included several idler pulleys as part of a belt drive from an engine sheave on a tractor to a sheave on the tiller. After the tiller was positioned, the relatively long belt would be pulled forward from the tiller and installed on the engine sheave.

The tiller included a spring-loaded flat idler pulley to counter the tension of the belt, which was adjusted by repositioning a V-idler pulley. The repositioning mechanism was simply a slot in which a bolt mounting the V-idler pulley was loosened, moved, and then retightened using a hand tool. The idler pulleys were not easily accessible for placement of the belt. Thus, this prior attachment presented several disadvantages in installation.

SUMMARY OF THE INVENTION

The invention is provided by a modular hitch unit that is attached to the tractor separately from the tiller unit. The division of the hitch unit from the tiller unit provides smaller, less bulky units for attachment to the tractor.

The hitch unit includes one hitching mechanism for attachment to the tractor and another hitching mechanism for attachment of the tiller. The hitch unit also includes two belt adjustment mechanisms, one for assisting in installing the belt and the other for adjusting the tension on the belt, and these can be adjusted by hand without the use of tools.

The hitch unit more particularly includes a body which carriers a mechanism for latching the hitch unit onto the rear of the tractor. The body also forms clevises which support short laterally extending rods on the front of the tiller. These rods are captured in the clevises to hitch the tiller to the hitch unit. The mechanism for assisting the installation of the belt is provided by a first idler pulley that is mounted on an arm pivoting around an idler adjustment axis. The idler arm is yieldably movable to counter tension on the belt until equilibrium is established. The second belt adjustment mechanism includes a second idler pulley mounted on a second arm which also pivots around the idler adjustment axis. The position of this arm is adjusted with a mechanism akin to a lead screw. The mechanism is turned through a hand knob to advance a pivot block that translates linear motion to pivotable motion of the pulley arm.

In another aspect of the invention, the yielding pulley is pivoted with a lever which in part forms the idler adjustment axis and which in part also forms a handle located conveniently outside the hitch body. The handle allows the pivoting of the yieldable idler pulley, which assists the placement of the belt on that pulley after it has been looped around the other pulleys and sheaves in the belt drive system.

It is one object of the invention to make it easier to hitch a tiller to a lawn and garden tractor.

It is another object of the invention to provide a tiller hitch which can be easily handled by the user.

It is another object of the invention to provide convenient, hand-operable mechanisms in the hitch unit which assist in locating and applying proper tension to a drive belt.

These and other objects and advantages of the invention will be apparent from their detailed description which follows and which refers to the drawings that are incorporated herein. The drawings illustrate a preferred embodiment of the invention, but the invention is applicable to other embodiments as well, and therefore, reference should be made to the claims herein for determining the scope of the invention.

BRIEF DESCRIPTION OF THE DRAWINGS

FIG. 1 is a left side view showing a hitch unit that incorporates the invention as it is used to couple a tiller to a lawn and garden tractor;

FIG. 2 is a detailed, partially exploded view of the units seen in FIG. 1;

DETAILED DESCRIPTION OF THE PREFERRED EMBODIMENT

Referring to FIGS. 1 and 2, the invention is illustrated in the form of a modular hitch unit 10 for hitching a belt-driven, ground-engaging implement, such as a tiller attachment 12, to a motorized vehicle, such as a lawn and garden tractor 11. As seen in FIG. 2, the hitch unit 10 detaches from both the tractor 11 and the tiller 12. The detachment from the tiller 12 provides significant advantages in performing the hitching operations as will be discussed later herein.

Figure 6:
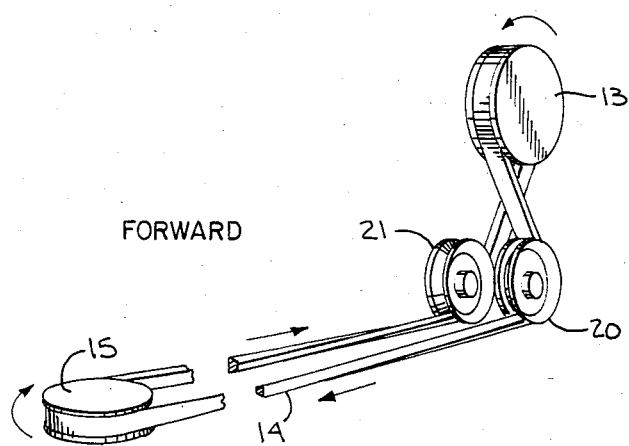
FIG. 6 is a schematic view of the belt drive system of FIG. 1 when the tiller is operated for forward rotation.
Figure 7:
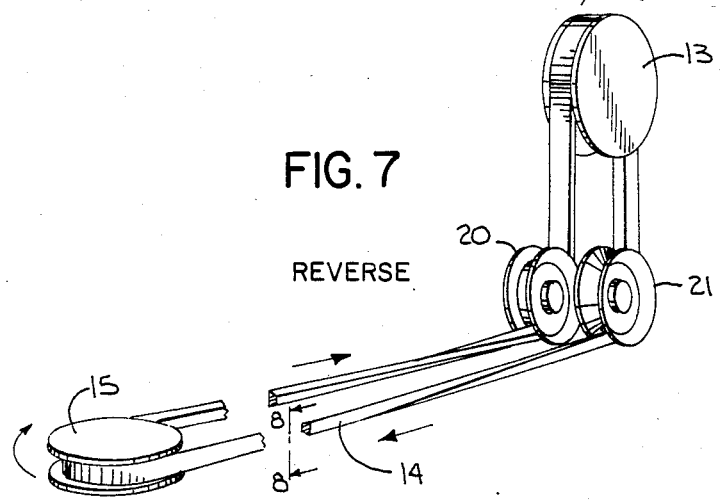
FIG. 7 is a schematic view of a belt drive system at FIG. 1 when the tiller is operated for reverse rotation.

The tiller attachment 12 includes a sheave 13, which is seen best in FIG. 2, and which is driven by a belt 14 that is seen best in FIGS. 1, 6 and 7. The belt 14 is driven from another sheave 15 seen underneath the front end of the tractor 11 in FIG. 1. The driving sheave 15 is powered through a vertical drive shaft 16 from an engine (not shown) within the tractor 11. The drive shaft 16 is coupled to the driving sheave 15 through a power take-off clutch 17 which is engaged when power is to be transmitted through the belt 14.

The hitch unit 10 provides for installation of a relatively long drive belt 14 on the sheaves 13, 15, as well as coupling the mounting plates 18, 19 seen in FIG. 2. The problem of installing the belt can be better appreciated by viewing FIGS. 6 and 7. There, the engine drive sheave 15 rotates in a clockwise direction as viewed from the top. A slack-side run of the looped drive belt 14 extends horizontally from the engine sheave 15, and then roughly ninety degrees around the idler pulley 21 to the tiller sheave 13. After looping around the tiller sheave 13 a drive-side run of the drive belt 14 wraps roughly ninety degrees around a second idler pulley 20 on its way back to the engine drive sheave 15. In FIG. 6 the tiller sheave 13 rotates in a counterclockwise direction as viewed from the left side, and this produces forward rotation of the hub and tine assemblies 22 seen in FIGS. 1 and 2. In FIG. 7 the tiller sheave 13 rotates in a clockwise direction as viewed from the left side, and this produces reverse rotation of the hub and tine assemblies 22 seen in FIGS. 1 and 2. A chain drive (not shown) transmits power from the tiller sheave 13 to the hub and tine assemblies 22.

With prior tillers, the drive belt extended forwardly from a unit combining the tiller and hitching mechanisms which was maneuvered for physical connection to the rear end of the tractor. The combined hitch and tiller mechanism was heavy and cumbersome to maneuver and it was not easy to assure proper positioning of the belt. The present hitch unit 10 is attached to the tractor 11 before the tiller unit and provides a convenient mechanism for positioning, and adjusting the tension of, the belt 14.

Figure 4:
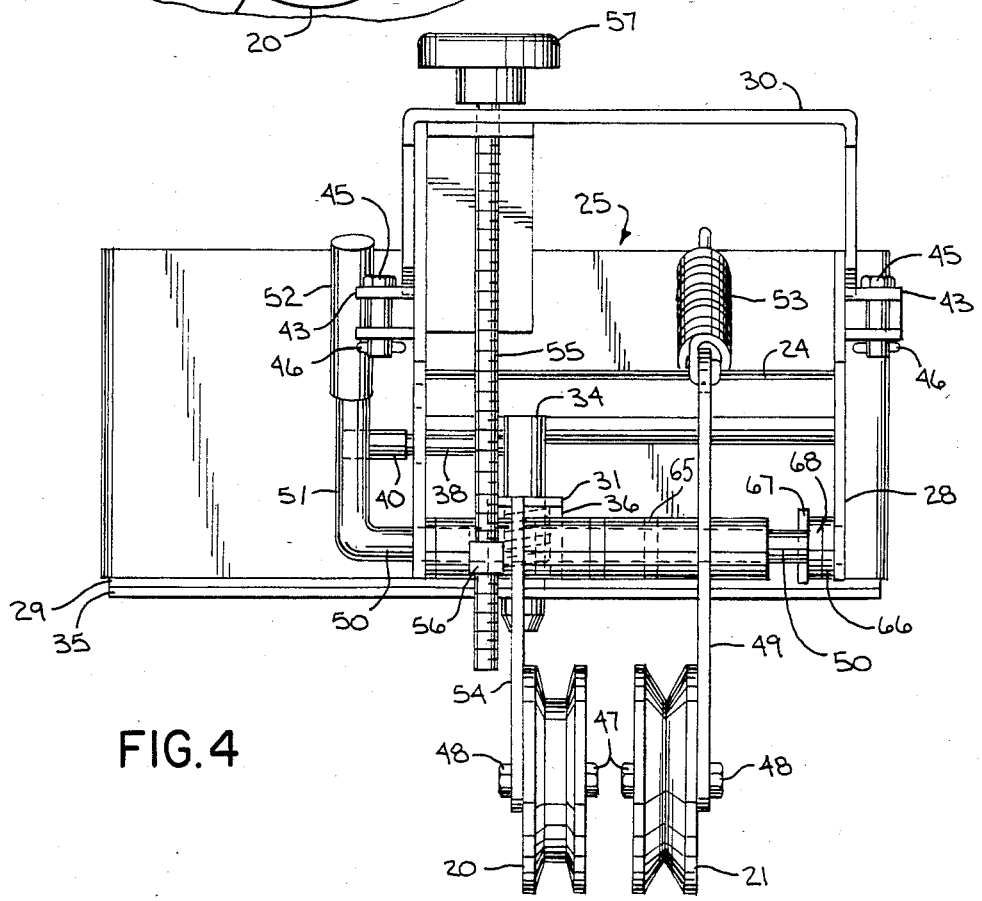
FIG. 4 is a rear end view of the hitch unit of FIGS. 1 and 2.
Figure 5:
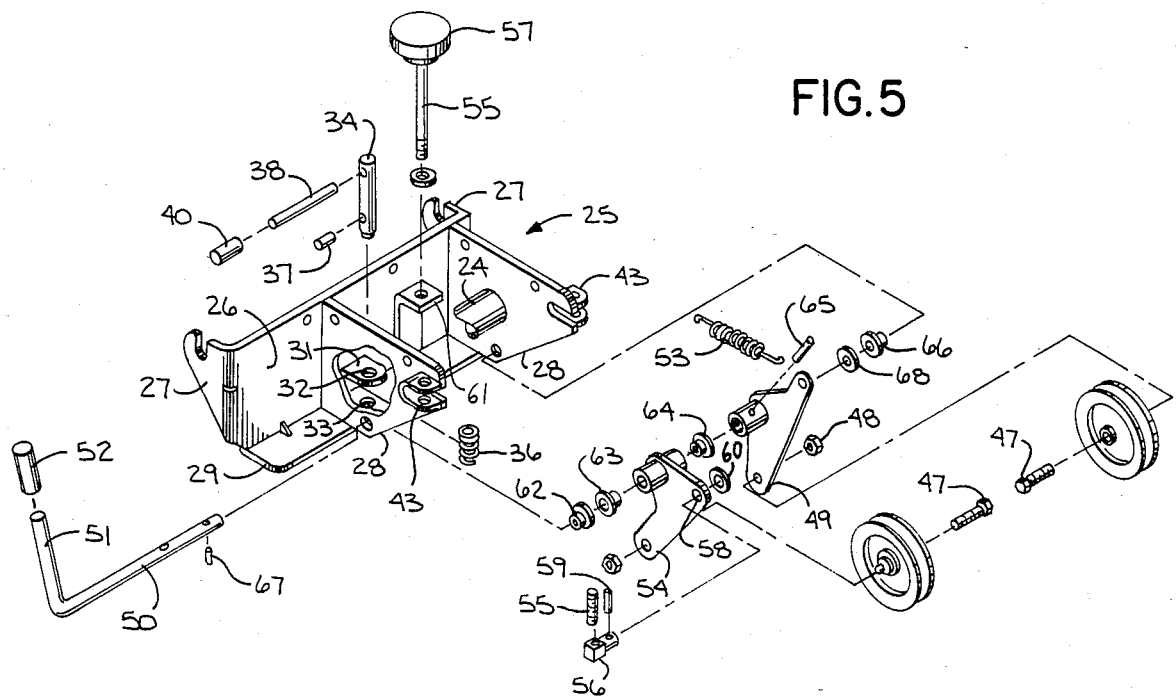
FIG. 5 is an exploded perspective view of the hitch unit of FIGS. 1 and 2.

The hitch unit 10 carries four mechanisms, two hitching mechanisms and two belt adjustment mechanisms, which are supported on a hitch body 25 seen in FIG. 5. The body 25 has an upright transverse wall 26, two ears 27 extending forwardly at opposite ends of the wall 26, and two spaced apart side walls 28 extending rearwardly to form a compartment. A pipe 24 extends between the side walls 28 and a bottom flange 29 extends rearwardly from the bottom edge of the transverse wall 26. A cover 30 (not seen in FIG. 5) is bolted to the side walls 28 to close the top of the compartment as seen in FIGS. 1, 2 and 4.

Figure 3:
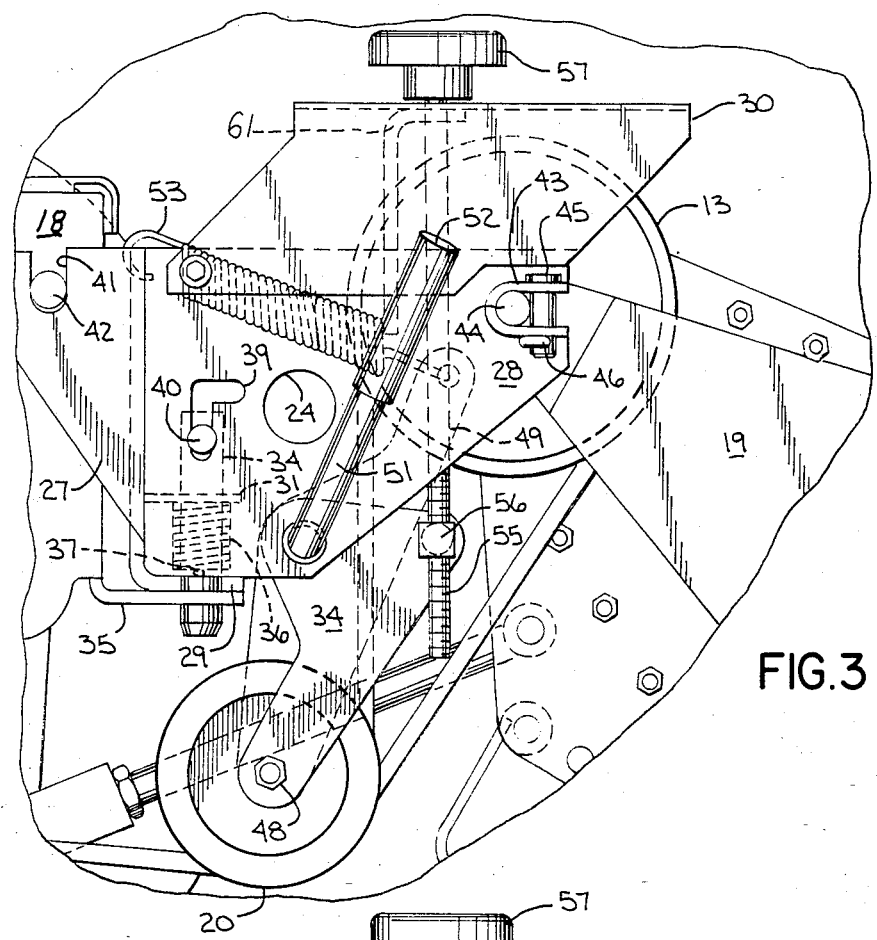
FIG. 3 is a left side view of the hitch unit of FIGS. 1 and 2, showing various details of the unit in phantom.

The first of the mechanisms to be described is the mechanism for attaching the hitch unit 10 to the rear support plate 18 on the tractor 11. Inside the compartment of the hitch unit 10 seen in FIG. 5, in its lower front portion, a half-bracket 31 is welded to the transverse wall 26, and together with the bottom flange 29 it forms a full bracket. The half-bracket 31 and the flange 29 have respective holes 32, 33 that are aligned to receive a hitch pin 34 that slides vertically through them and through a flange 35 on the rear mounting plate 18 of the tractor as seen in FIG. 3. A compression spring 36 is coiled around the hitch pin 34 and is trapped between the underside of the half-bracket 31 and a roll pin 37 inserted laterally through a lower end of the hitch pin 34. The spring 36 will bear down upon the roll pin 37 to hold the hitch pin 34 in the position seen in FIG. 3. A second roll pin 38 seen in FIGS. 4 and 5 is inserted laterally through the upper end of the hitch pin 34 and through a slot 39 in the left side wall 28 having the shape of an inverted "L" as seen in FIG. 3. A grip 40 is fitted on the end of the roll pin 38, which extends outside the side wall 28 to form a hitch pin handle. When the hitch pin handle is positioned in the vertical leg of the "L", the compression spring 36 will be extended to its hitching or latched position. When the hitch pin handle is moved up and over into the horizontal leg of the L-shaped slot 39 it will hold the spring 36 in compression and the hitch pin 34 in a raised and unlatched position, so that the hitch unit 10 can be detached from the rear mounting plate 18 on the tractor 11. The hitch unit 10 is also secured against rearward movement by its forwardly extending ears 27 which have upwardly opening slots 41 for receiving the support rods 42 (only one of which is seen in FIGS. 1 and 3) extending outwardly from opposite sides of the rear mounting plate 18 on the tractor 12.

The second hitching mechanism is provided at the rear of the side walls 28 seen in FIGS. 3 and 5 by clevises 43 formed on the outer sides of the side walls 28 with slots opening to the rear of the hitch unit 10. These slots receive support rods 44 extending laterally in opposite directions from the mounting plates 19 on the tiller attachment 12. After the drive belt 14 has been looped around the sheave 13 on the tiller attachment 12, these support rods 44 are maneuvered into the slots and secured with clevis pins 45 inserted through the clevises 43. The clevis pins 45 are further secured by Klik pins 46 inserted through one end to hold them in place across the slot openings into the clevises 43.

Figure 8:
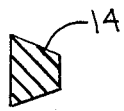
FIG. 8 is a detail sectional view of the belt taken in the plane indicated by line 8—8 in FIG. 7.

The two belt adjustment mechanisms include a hand-operable, belt take-up mechanism an a belt tension adjustment mechanism. As seen in FIG. 4, the belt take-up mechanism includes an idler pulley 21 with a V-shaped groove for receiving the tapered portion of the drive belt 14. The drive belt has the well-known modified "V" cross section as seen in FIG. 8. The V-groove idler pulley 21, which rotates on its own internal bearing assemblies, is mounted with a hex-head screw 47 and a lock nut 48 to the lower end of a movable idler arm 49. The idler arm 49 is mounted to pivot around an idler adjustment axis defined by a cross shaft portion 50 of a L-shaped take-up lever. The shaft 50 forms one leg of the L-shaped lever, while a second radially extending leg 51 is located outside the left side wall 28 and has a grip 52 on its free end to complete a handle. The upper end of the movable idler arm is linked by a tension spring 53 to the body 25 of the hitch unit.

When the belt take-up lever 51, 52 is moved clockwise as viewed from FIG. 3, the V-groove idler pulley 21 (hidden behind pulley 20) will move inwardly and the spring 53 will be placed under tension. When the belt take-up lever 51, 52 is released, the V-groove idler pulley 21 will engage the slack-side run of the belt 14 seen in FIG. 6 and take up excess slack in the belt. The spring 53 will then counterbalance the tension placed on the belt-greater tension on the belt will cause greater pivoting of the movable arm 49 and greater extension of the spring 53.

As seen in FIG. 4, the belt tension adjustment mechanism uses an idler pulley 20 that has a flat-bottomed groove for receiving the flat side of the V-belt 14. This pulley 20 also includes internal bearings and is mounted with a hexhead screw 47 and lock nut 48 to the lower end of fixed, but adjustable, idler arm 54. This arm 54 pivots around the idler adjustment axis provided by the cross shaft 50 of the belt take-up lever. Whereas the movable arm 49 pivots when the lever is moved, the fixed arm 54 does not. This is because the fixed idler 20 engages the drive side or the "tight side" of the drive belt 14. Belt tension is adjusted on the side of the belt 14 by the tension adjustment mechanism, which includes a rotating threaded stem 55 and a pivot block 56 that moved along the lower portion of the stem 55 as the hand knob 57 at the upper end of the stem 55 is turned. The stem 55 penetrates the cover 30 and a bracket 61 that is attached to the left sidewall 28 to support the cover 30. The pivot block 56 has a tapped hole in its block portion and also has a journal portion that rides in a bearing surface provided by a hole 58 (FIG. 5) in an elbow of the fixed idler pulley arm 54. The journal portion is secured to the inside of this arm 54 by a cotter pin 59 that traps a washer 60 against the arm 54. When the stem 55 is advanced downward through the pivot block 56 seen in FIG. 3, the arm 54 moves counterclockwise around shaft 50, and when the stem 54 is withdrawn upward through the pivot block 56, the arm 54 moves clockwise.

FIGS. 4 and 5 show hardware for allowing the fixed arm 54 to be adjusted without affecting the belt take-up lever 50-52. Three respective flange bearings 62-64 on the cross shaft 50 fit in the left side wall 28 and in opposite ends of a sleeve formed on the fixed arm 54. The "fixed" arm 54 thus rotates freely on the bearings 63, 64 and around the shaft 50. On the other hand, a sleeve on the movable idler pulley arm 49 is connected for rotation with the cross shaft 50 by a roll pin 65. The far end of the cross shaft 50 rides in a flange bearing 66 inserted in the right side wall 28. To prevent the shaft from sliding to the right, a cotter pin 67 is inserted through the shaft 50 and traps a washer 68 against the flange bearing 66 inside the right side wall 28.

When it is desired to change from forward to reverse rotation of the hub and tine assemblies 22 in FIGS. 1 and 2, the idler pulleys 20, 21 are detached from their respective arms and the positions seen in FIG. 6 and remounted in reverse position as seen in FIG. 7. Then, the right-hand or movable idler pulley 20 is the idler for engaging the flat side of the belt 14 and the fixed idler pulley is the V-groove pulley 21.

The hitching procedure is as follows. The hitch unit 10 of the invention is attached to the tractor rear mounting plate 18 in FIGS. 1 and 2 by slipping the slotted ears 27 around the projecting support rods 42 and operating the hitch pin 34 as described above. Next, the tiller 12 is hitched to the hitch unit 10 by locating the supports 44 in the clevises 43, and inserting the pins 45, 46 seen in FIG. 3 to secure the tiller 12. The belt 14 is then looped around the tiller sheave 13 and the left-hand idler pulley. It is then further looped around the engine sheave 15. At this point there may be insufficient slack in the belt 14 to place it on the remaining idler pulley. Therefore the belt take-up lever 51, 52 is operated to pivot the idler pulley out of the way and then back to engage the belt in its groove. At this point, the amount of tension on the belt is variable and will be counterbalanced by the tension spring 53 in FIG. 3. After the belt has been installed, the proper belt tension is achieved by turning the hand knob 57 seen in FIGS. 3 and 4 until the idler pulleys 20, 21 are aligned along a common axis of the pulley rotation.

To complete the adjustment of the tractor for operation with the tiller 12 a lift rod 70 seen in FIGS. 1-3 is connected to a lift mechanism on the tractor 11 by coupling a slotted clevis 71 on the end of the lift arm 70 to a pivoting lift arm 72 at the rear of the tractor 11. This pivoting lift arm 72 is operated by the tractor lift lever 73 and a link 74 is relocated to allow operation of the arm 72 for the proper amount of the lift for the tiller attachment 12.

From this description, it should be apparent that the hitch unit provides greater convenience for attaching a tiller unit to a lawn and garden tractor that has been known heretofore. The hitch unit is compact, versatile, and small enough to be conveniently handled by one person. The ability to detach the various hitching and belt adjustment mechanisms from the tiller unit reduces its size and weight as well as making the hitching operation less cumbersome.

This detailed description has been by way of example, and not by way of limitation. Therefore, to distinguish that which is essential to the invention from that which has been described by way of example only, the following claims are made.

I claim:

1. A hitch unit for coupling a belt-driven, ground engaging implement to a motorized vehicle and for taking up slack in a looped drive belt that is adapted to be installed with a run from a driving sheave on the motorized vehicle to a driven sheave on the ground-engaging implement, and with another run from the driven sheave to the driving sheave, the hitch unit comprising:
    a body;
    means on the body that is movable between an unlatched position and a latched position for attaching and detaching the hitch unit to a rear end of the motorized vehicle;
    means on the body for supporting a front end of the ground-engaging implement;
    first idler means for engagment of one of the runs of the drive belt, the first idler means being mounted to the body to pivot around an idler adjustment axis transverse to the rear end of the motorized vehicle, and the first idler means being biased to counter tension of the drive belt;
    second idler means spaced laterally from the first idler means for engagement of the other of the runs of the drive belt, the second idler means being mounted to pivot around the idler adjustment axis independent of the pivoting of the first idler means; and
    manually operable adjustment means carried by the body and coupled to the second idler means for adjusting the pivotable position of the second idler means relative to the idler adjustment axis to control tension of the drive belt.

2. The hitch unit of claim 1, wherein:
    the means for attaching the hitch unit to the rear end of the motorized vehicle includes a downwardly directed spring-biased pin mounted on the body and a handle coupled to the spring-biased pin; and
    wherein an upright portion of the body forms an L-shaped slot, the handle extending through the L-shaped slot and the handle moving between the unlatched position formed by one leg of the L-shaped slot and the latched position formed by the other leg of the L-shaped slot.

3. The hitch unit of claim 1, further comprising an L-shaped handle with a first leg extending along the idler adjustment axis to support the first and second idler means and with a second leg extending outside the body to provide a hand-operable lever for pivoting the first idler means, which is fixed on the first leg of the handle, to assist installation of the belt.

4. The hitch unit of claim 1, wherein the manually operable adjustment means includes a stem with a threaded connection to the second idler means so that as the thread is advanced by rotation the second idler means will pivot around the idler adjustment axis.

5. The hitch unit of claim 4, wherein a hand-operable knob is attached to one end of the stem.

6. The hitch unit of claim 1, wherein:

the first idler means includes a first idler arm that pivots around the idler adjustment axis and a first idler pulley at a lower end of the first idler arm; and wherein the second idler means includes a second idler arm that pivots around the idler adjustment axis independent of the movement of the first idler arm, and a second idler pulley at a lower end of the second idler arm.

7. The hitch unit of claim 6, wherein:

the first idler pulley has a groove for receiving a flat side of a drive belt; and wherein the second idler pulley has a V-shaped groove for receiving a tapered portion of the belt.

8. The hitch unit of claim 1, further comprising means for securing the front end of the ground-engaging implement to the means for supporting the front end of the implement on the body.

9. A hitch unit for coupling a belt-driven, ground-engaging implement to a motorized vehicle and for taking up slack in a looped drive belt that is adapted to be installed with a run from a driving sheave on the motorized vehicle to a driven sheave on the ground-engaging implement, and with another run from the driven sheave to the driving sheave, the hitch unit comprising:

a body;

means on the body that is movable between an unlatched position and a latched position for attaching and detaching the hitch unit to a rear end of the motorized vehicle;

means on the body for supporting a front end of the ground-engaging implement;

first idler means for engagement of one of the runs of the drive belt, the first idler means being pivotably mounted to the body, and the first idler means being biased to counter tension of the drive belt;

second idler means spaced laterally from the first idler means for engagement of the other of the runs of the drive belt, the second idler means being mounted to pivot independent of the pivoting of the first idler means; and a stem carried by the body with a threaded and pivotable connection to the second idler means for adjusting the pivotable position of the second idler means as the thread is advanced by rotation of the stem to control tension of the drive belt.

10. The hitch unit of claim 9, further comprising an L-shaped handle with a first leg supporting the first and second idler means and with a second leg extending outside the body to provide a hand-operable lever for pivoting the first idler means to assist installation of the belt.

* * * * *